US012626037B2

(12) United States Patent
Shintani et al.

(10) Patent No.: US 12,626,037 B2
(45) Date of Patent: May 12, 2026

(54) VEHICLE RESPONSE PREDICTING DEVICE, TRAINING DEVICE, METHOD AND RECORDING MEDIUM ON WHICH A PROGRAM IS RECORDED

(71) Applicants: Kohei Shintani, Nisshin Aichi-ken (JP); Yutaka Sasaki, Nagoya Aichi-ken (JP); Makoto Miwa, Nagoya Aichi-ken (JP); Kohei Makino, Nagoya Aichi-ken (JP)

(72) Inventors: Kohei Shintani, Nisshin Aichi-ken (JP); Yutaka Sasaki, Nagoya Aichi-ken (JP); Makoto Miwa, Nagoya Aichi-ken (JP); Kohei Makino, Nagoya Aichi-ken (JP)

(73) Assignees: TOYOTA JIDOSHA KABUSHIKI KAISHA, Toyota (JP); TOYOTA SCHOOL FOUNDATION, Nagoya (JP)

( * ) Notice: Subject to any disclaimer, the term of this patent is extended or adjusted under 35 U.S.C. 154(b) by 1146 days.

(21) Appl. No.: 17/403,499

(22) Filed: Aug. 16, 2021

(65) Prior Publication Data

US 2022/0050944 A1 Feb. 17, 2022

(30) Foreign Application Priority Data

Aug. 17, 2020 (JP) ................................. 2020-137639

(51) Int. Cl.
*G06F 30/27* (2020.01)
*G06F 30/15* (2020.01)
(Continued)

(52) U.S. Cl.
CPC .............. *G06F 30/27* (2020.01); *G06F 30/15* (2020.01); *G06N 3/08* (2013.01); *G06F 2119/02* (2020.01)

(58) Field of Classification Search
CPC ............ G06F 30/15; G06F 30/27; G06N 3/08
See application file for complete search history.

(56) References Cited

U.S. PATENT DOCUMENTS

2019/0050711 A1* 2/2019 Yao ........................ B60W 40/00
2019/0384303 A1* 12/2019 Muller ................... G08G 1/166
(Continued)

FOREIGN PATENT DOCUMENTS

CN 107463907 A 12/2017
CN 108961790 A 12/2018
(Continued)

OTHER PUBLICATIONS

Arden Dertat, "Applied Deep Learning—Part 4: Convolutional Neural Networks". Nov. 8, 2017, retrieved from https://towardsdatascience.com/applied-deep-learning-part-4-convolutional-neural-networks-584bc134c1e2. (Year: 2017).*
(Continued)

*Primary Examiner* — Bijan Mapar
(74) *Attorney, Agent, or Firm* — Dinsmore & Shohl LLP

(57) ABSTRACT

A vehicle response predicting device comprising: a memory; and a processor coupled to the memory, wherein the processor is structured so as to, by using a convolutional neural network model that has been trained in advance, and that is for predicting response of a vehicle, and whose input is input data expressing a time series of an input to the vehicle and a characteristic of the vehicle, predict response of a vehicle that is an object of prediction, from input data expressing a time series of an input to the vehicle that is the object of prediction and a characteristic of the vehicle that is the object of prediction.

7 Claims, 7 Drawing Sheets

(51) Int. Cl.
G06F 119/02 (2020.01)
G06N 3/08 (2023.01)

(56) References Cited

U.S. PATENT DOCUMENTS

| | | | |
|---|---|---|---|
| 2020/0042876 A1 | 2/2020 | Katoh et al. | |
| 2021/0049033 A1 | 2/2021 | Okawa et al. | |
| 2022/0050943 A1 | 2/2022 | Yamamoto et al. | |
| 2022/0126864 A1* | 4/2022 | Moustafa ........... | B60W 60/0011 |

FOREIGN PATENT DOCUMENTS

| | | | |
|---|---|---|---|
| JP | 2007091104 A | 4/2007 | |
| JP | 2018-195029 A | 12/2018 | |
| JP | 2019-153246 A | 9/2019 | |
| JP | 2019214249 A | 12/2019 | |
| JP | 2019217867 A | * 12/2019 | |
| JP | 2020-043270 A | 3/2020 | |

OTHER PUBLICATIONS

Yu, F., & Koltun, V. (2015). Multi-scale context aggregation by dilated convolutions. arXiv preprint arXiv:1511.07122. (Year: 2015).*
Ladický, L'Ubor et al., "Data-driven fluid simulations using regression forests", ACM Trans. Graph., vol. 34, No. 6, pp. 199:1-199:9, Oct. 2015.
He, Kaiming, et al., "Deep residual learning for image recognition", In Proceedings of the IEEE conference on computer vision and pattern recognition, pp. 770-778, 2016.
Yu, Fisher et al, "Multi-scale context aggregation by dilated convolutions", In International Conference on Learning Representations (ICLR), May 2016.
Makino, Kohei et al., "Surrogate modeling of vehicle dynamics using deep learning", The Proceedings of Design & Systems Conference, 2019.

* cited by examiner

FIG.4

VEHICLE RESPONSE PREDICTING DEVICE, TRAINING DEVICE, METHOD AND RECORDING MEDIUM ON WHICH A PROGRAM IS RECORDED

CROSS-REFERENCE TO RELATED APPLICATION

This application is based on and claims priority under 35 USC 119 from Japanese Patent Application No. 2020-137639 filed on Aug. 17, 2020, the disclosure of which is incorporated by reference herein.

BACKGROUND

Technical Field

The present disclosure relates to a vehicle response predicting device, a training device, a method, and a recording medium on which a program is recorded.

Related Art

In vehicle development, the behavior of a vehicle at the time of traveling is inferred from data of the vehicle body by using CAE (Computer Aided Engineering) that is a simulation by a computer, and research into predicting performances of vehicles is advancing on the basis of such inferences.

The approach of using machine learning as a substitute model for CAE is known. For example, a technique using random forests is disclosed in L'ubor Ladick'y, SoHyeon Jeong, Barbara Solenthaler, Marc Pollefeys, and Markus Gross. Data-Driven Fluid Simulations using Regression Forests. ACM Trans. Graph., Vol. 34, No. 6, pp. 199:1-199:9, October 2015.

However, the approach of the above-referenced L'ubor Ladick'y, SoHyeon Jeong, Barbara Solenthaler, Marc Pollefeys, and Markus Gross. Data-Driven Fluid Simulations using Regression Forests. ACM Trans. Graph., Vol. 34, No. 6, pp. 199:1-199:9, October 2015 does not use a model that takes the entire time series into consideration, and is difficult to apply to an object that requires consideration of a continuous time series such as CAE analysis of vehicle driving performance.

SUMMARY

An object of the present disclosure is to provide a vehicle response predicting device, a training device, a method and a program, which can accurately predict response of a vehicle with respect to the time series of an input to the vehicle.

A first aspect is a vehicle response predicting device including a predicting section that, by using a convolutional neural network model that has been trained in advance, and is for predicting response of a vehicle, and whose input is input data expressing the time series of an input to the vehicle and a characteristic of the vehicle, predicts response of a vehicle that is an object of prediction, from input data expressing the time series of an input to the vehicle that is the object of prediction and a characteristic of the vehicle that is the object of prediction. Here, the characteristic of the vehicle is a parameter relating to a physical structure of the vehicle.

In accordance with the vehicle response predicting device of the first aspect, the predicting section predicts response of a vehicle that is an object of prediction by using a convolutional neural network model that is for predicting response of a vehicle and whose input is input data expressing the time series of an input to the vehicle and a characteristic of the vehicle. At this time, at the convolutional neural network model, convolution processing is carried out on the input data that expresses the time series of an input to the vehicle and a characteristic of the vehicle. Due thereto, response of the vehicle with respect to the time series of an input to the vehicle can be predicted accurately.

Note that, in a vehicle response predicting device of a second aspect, in the vehicle response predicting device of the first aspect, output of at least one convolutional layer of the convolutional neural network model is results obtained by applying an activation function to a sum of convolution results, which are based on output of a layer that is one before, and the output of the layer that is one before. In accordance with the vehicle response predicting device of the second aspect, the convolutional neural network model can be trained efficiently.

Further, in a vehicle response predicting device of a third aspect, in the vehicle response predicting device of the first or second aspect, the input data is a matrix in which vectors, which express an input to the vehicle and a characteristic of the vehicle, are lined up in time series order. In accordance with the vehicle response predicting device of the third aspect, response of the vehicle can be predicted by the convolution processing at the convolutional neural network model, while taking the time series of an input to the vehicle into consideration.

Further, in a vehicle response predicting device of a fourth aspect, in the vehicle response predicting device of any of the first through third aspects, a filter of the convolutional layer includes plural filters having different intervals, in a time series direction, of values convolved by the filters. In accordance with the vehicle response predicting device of the fourth aspect, convolution processing can be carried out at different time periods at a convolutional neural network model.

A fifth aspect is a training device including: a preparing section that prepares training data that expresses input data, which expresses a time series of an input to a vehicle and a characteristic of the vehicle, and response of the vehicle, from response of a vehicle that are obtained as results of simulation based on a time series of an input to the vehicle and a characteristic of the vehicle; and a training section that trains a convolutional neural network model for predicting response of the vehicle by using the input data as input, on the basis of the training data.

In accordance with the training device of the fifth aspect, the preparing section prepares training data that expresses input data, which expresses the time series of an input to a vehicle and a characteristic of the vehicle, and response of the vehicle, from response of a vehicle that is obtained as results of simulation based on the time series of an input to the vehicle and a characteristic of the vehicle. On the basis of the training data, the training section trains a convolutional neural network model for predicting response of the vehicle by using the input data as input. In the convolutional neural network model, convolution processing is carried out on the input data that expresses the time series of an input to the vehicle and a characteristic of the vehicle. Due thereto, response of the vehicle with respect to the time series of an input to the vehicle can be predicted accurately.

In a training device of a sixth aspect, in the training device of the fifth aspect, the preparing section prepares training data that expresses input data, which expresses a time series of an input to a vehicle and a characteristic of the vehicle, and a time series of a state of the vehicle, and response of the vehicle, from a time series of a state of a vehicle and response of the vehicle that are obtained as results of simulation based on a time series of input to the vehicle and a characteristic of the vehicle, and the training section trains the convolutional neural network model such that intermediate output of the convolutional neural network model corresponds to the time series of the state of the vehicle of the training data, and final output of the convolutional neural network model corresponds to the response of the vehicle of the training data. The training device of the sixth aspect can train a convolutional neural network model that is obtained as results of simulation and that takes into consideration the time series of a state of the vehicle. Here, the time series of a state of the vehicle is the time series of the position, the attitude, or the traveling state of the vehicle.

A seventh aspect is a vehicle response predicting method wherein a predicting section, by using a convolutional neural network model that has been trained in advance, and that is for predicting response of a vehicle, and whose input is input data expressing a time series of an input to the vehicle and a characteristic of the vehicle, predicts response of a vehicle that is an object of prediction, from input data expressing a time series of an input to the vehicle that is the object of prediction and a characteristic of the vehicle that is the object of prediction.

An eighth aspect is a training method wherein a preparing section prepares training data that expresses input data expressing a time series of an input to a vehicle and a characteristic of the vehicle, and response of the vehicle, from response of a vehicle that is obtained as results of simulation based on a time series of an input to the vehicle and a characteristic of the vehicle, and a training section trains a convolutional neural network model for predicting response of the vehicle by using the input data as input, on the basis of the training data.

A ninth aspect is a non-transitory recording medium on which is recorded a vehicle response predicting program for causing a computer to, by using a convolutional neural network model that has been trained in advance, and that is for predicting response of a vehicle, and whose input is input data expressing a time series of an input to the vehicle and a characteristic of the vehicle, execute predicting of response of a vehicle that is an object of prediction, from input data expressing a time series of an input to the vehicle that is the object of prediction and a characteristic of the vehicle that is the object of prediction.

A tenth aspect is a non-transitory recording medium on which is recorded a training program executable by a computer to perform: preparing of training data that expresses input data expressing a time series of an input to a vehicle and a characteristic of the vehicle, and response of the vehicle, from response of a vehicle that is obtained as results of simulation based on a time series of an input to the vehicle and a characteristic of the vehicle; and training of a convolutional neural network model for predicting response of the vehicle by using the input data as input, on the basis of the training data.

In accordance with the present disclosure, response of a vehicle with respect to the time series of an input to the vehicle can be predicted accurately.

BRIEF DESCRIPTION OF THE DRAWINGS

Exemplary embodiments of the present disclosure will be described in detail based on the following figures, wherein:

FIG. 4 is a drawing showing an example of filters of a convolutional neural network model;

DETAILED DESCRIPTION

Figure 1:
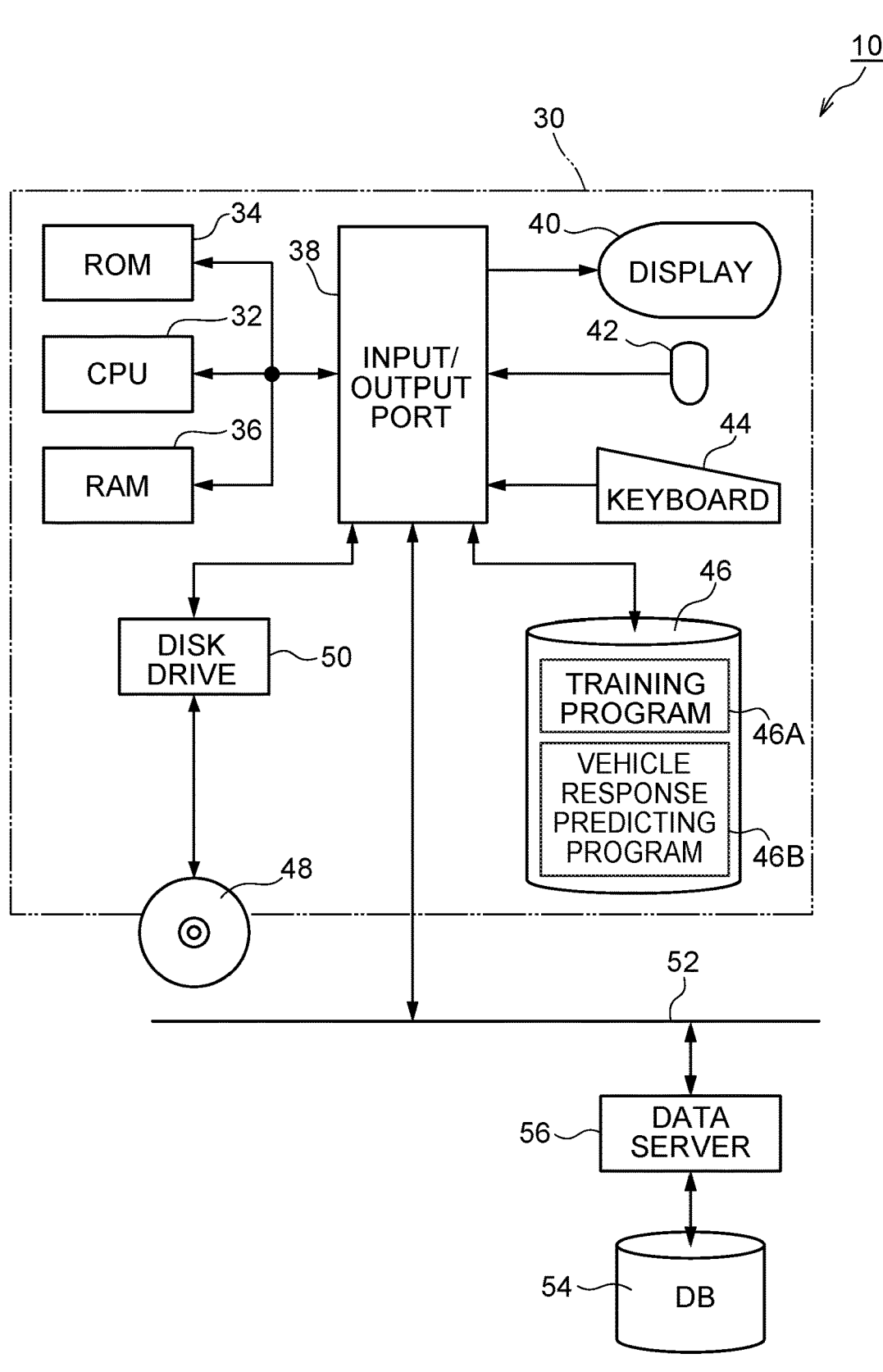
FIG. 1 is a block drawing showing an example of the concrete structure of a vehicle response predicting device relating to an embodiment of the present disclosure.

A vehicle response predicting device relating to a present embodiment is described hereinafter by using FIG. 1. FIG. 1 is a block drawing showing an example of the concrete structure of a vehicle response predicting device 10 relating to an embodiment of the present disclosure.

The vehicle response predicting device 10 is structured to include a computer 30. The computer 30 has a CPU 32, a ROM 34, a RAM 36 and an input/output port 38. As an example, the computer 30 may be a type that can execute advanced computing processings at high speed, such as an engineering workstation, a supercomputer, or the like. Note that the CPU 32 is an example of the processor, and the RAM 34 is an example of the memory.

At the computer 30, the CPU 32, the ROM 34, the RAM 36 and the input/output port 38 are connected to one another via various busses such as an address bus, a data bus, a control bus, and the like. A display 40, a mouse 42, a keyboard 44, a hard disk (HDD) 46, and a disk drive 50 that reads-out information from any of various types of disks 48 (e.g., a CD-ROM, a DVD, or the like), are respectively connected to the input/output port 38 as various types of input/output devices.

Further, a network 52 is connected to the input/output port 38, and transmitting and receiving of information to and from various devices that are connected to the network 52 are possible. In the present embodiment, a data server 56 to which a database (DB) 54 is connected is connected to the network 52, and transmitting and receiving of information to and from the DB 54 are possible. The computer 30 may also function as the data server 56 and the DB 54.

Data of a 3D (three-dimensional) model of a vehicle that is the object of vehicle response prediction, data of results of simulations by CAE relating to vehicle response prediction, and the like are stored in the DB 54. The storing of information into the DB 54 may be the storage of data via the computer 30 or the data server 56, or may be the storage of data via another device that is connected to the network 52. The data of the 3D model that is stored in the DB 54 may be data of a vehicle that is generated by CAD (Computer Aided Design), or, in order to facilitate computation processing, may be data whose geometry has been adjusted in advance.

The data of the results of simulations that is stored in the DB 54 is data that includes a characteristic of the vehicle on which simulations by CAE relating to vehicle response prediction have been carried out, the time series of an input to the vehicle, and the time series of a state of the vehicle and response of the vehicle that are obtained as the results of the simulations based on a characteristic of the vehicle and the time series of an input.

In the present embodiment, explanation is given of a case in which data of a 3D model of a vehicle that is the object of vehicle response prediction, and data of results of simulations by CAE relating to vehicle response prediction, and the like are stored in the DB 54 that is connected to the data server 56. However, the information of the DB 54 may be stored in the HDD 46 that is built into the computer 30, or in an external storage device such as an externally attached hard drive or the like.

A training program 46A for training a convolutional neural network model that predicts vehicle response, and a vehicle response predicting program 46B for predicting vehicle response, are installed in the HDD 46 of the computer 30. In the present embodiment, the convolutional neural network model for predicting vehicle response is trained by the CPU 32 executing the training program 46A. Further, the vehicle response is predicted by the CPU 32 executing the vehicle response predicting program 46B. Further, the CPU 32 displays the results of prediction on the display 40. Note that there are several methods for installing the training program 46A and the vehicle response predicting program 46B of the present embodiment in the computer 30. For example, the training program 46A and the vehicle response predicting program 46B are installed in the HDD 46 due to the training program and the vehicle response predicting program being stored on a CD-ROM or a DVD or the like, and the disk 48 being set in the disk drive 50, and the CPU 32 executing set-up programs. Or, the training program 46A and the vehicle response predicting program 46B may be installed in the HDD 46 by communication with another information processing device that is connected to the computer 30 via a dial-up line or the network 52.

Figure 2:
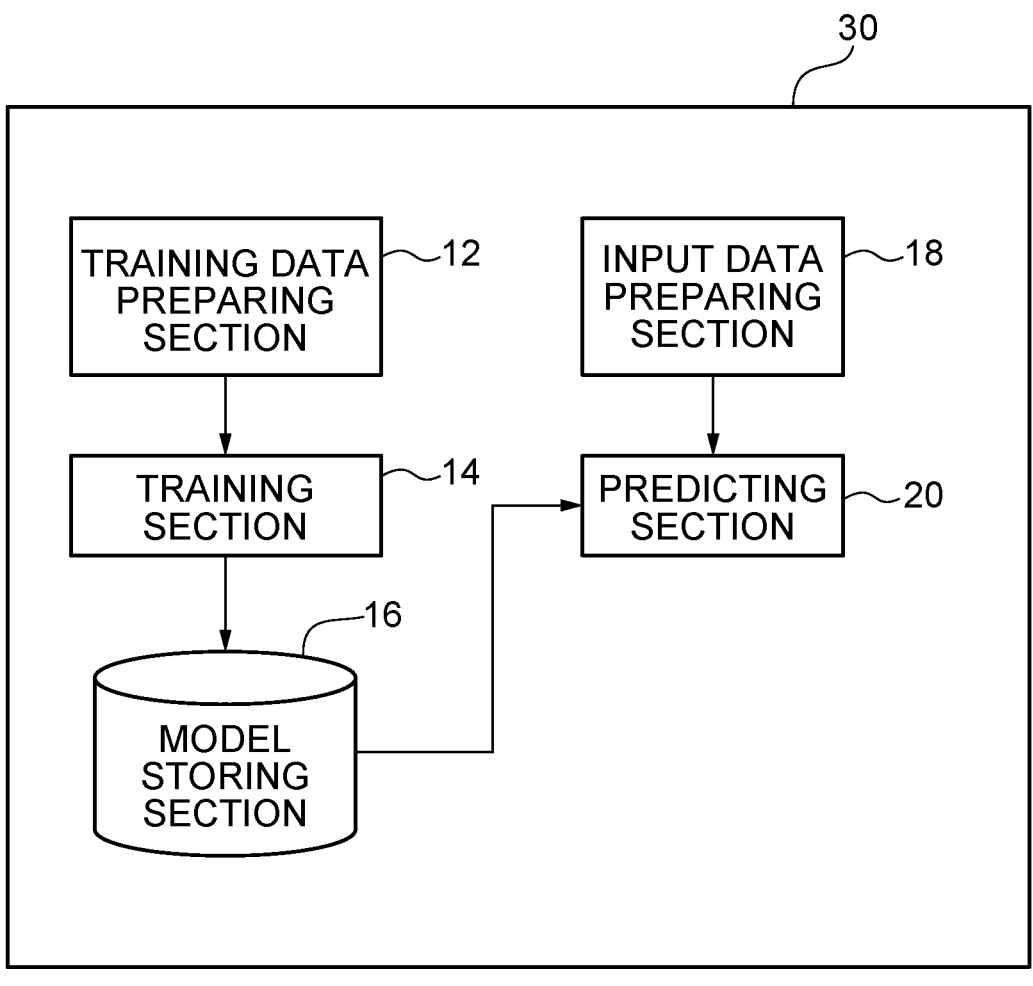
FIG. 2 is a block drawing showing an example of functional structures of a computer relating to the embodiment of the present disclosure.

The functional structures of the computer 30 are described next. FIG. 2 is a block drawing showing an example of the functional structures of the computer 30.

As shown in FIG. 2, the computer 30 has a training data preparing section 12, a training section 14, a model storing section 16, an input data preparing section 18, and a predicting section 20.

The training data preparing section 12 prepares, from the data of the simulation results that is stored in the DB 54, training data that expresses input data that expresses the time series of an input to the vehicle and a characteristic of the vehicle, the time series of a state of the vehicle, and response of the vehicle. For example, the training data preparing section 12 prepares training data that expresses input data, which expresses the time series data of the steering angle that is an input to the vehicle and a characteristic of the vehicle, the time series of a state such as the position, the roll angle or the like of the vehicle, and vehicle response such as the maximum value of the roll angle or the like.

On the basis of the training data, the training section 14 trains a convolutional neural network model for predicting vehicle response by using the input data as the input. Concretely, the training section 14 trains the convolutional neural network model such that intermediate output of the convolutional neural network model corresponds to the time series of a state of the vehicle of the training data, and the final output of the convolutional neural network model corresponds to the vehicle response of the training data.

Figure 3:
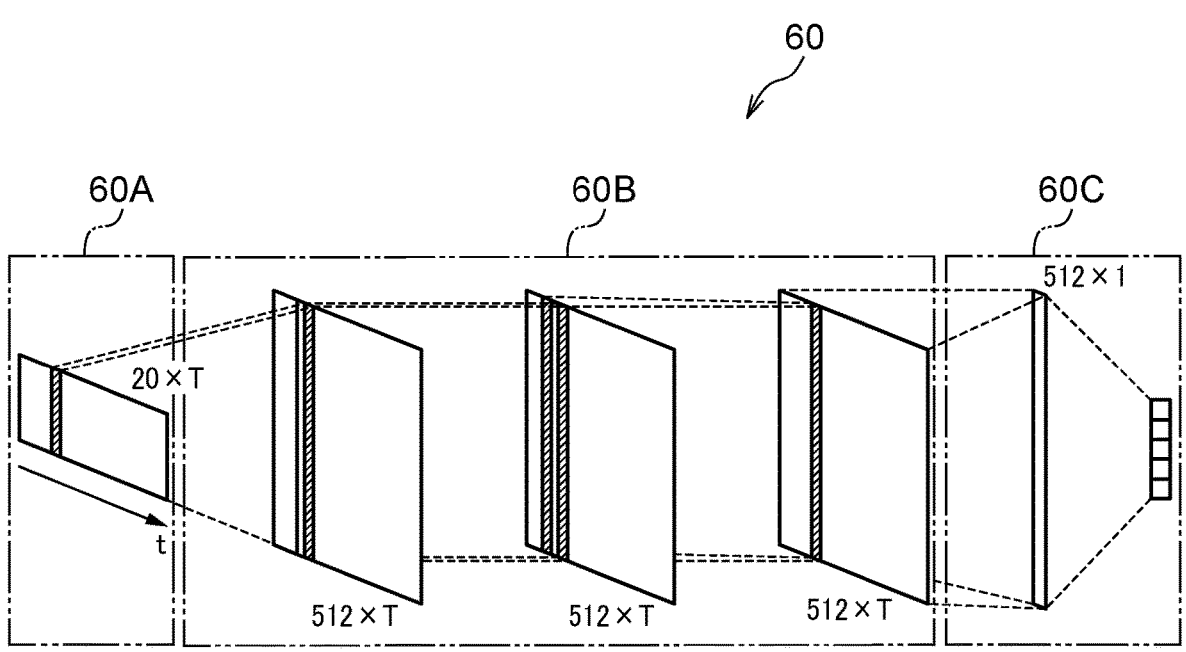
FIG. 3 is a schematic drawing showing an example of a convolutional neural network model.

A convolutional neural network model (hereinafter called CNN model) is described here. As shown in FIG. 3, a CNN model 60 is structured to include an input section 60A, a simulator section 60B and a computing section 60C.

The input section 60A receives, as input data, a matrix in which vectors, which express inputs to the vehicle and characteristic vectors of the vehicle, are lined up in time series order.

Concretely, the input section 60A receives, as input data, matrix x in which vectors $x_t$, which express steering angle $\hat{\delta}t$ that is input to the vehicle and characteristic vector p of the vehicle, are lined up in time series order. Because the characteristic vectors that are included in the vectors $x_t$ of the respective points in time t do not vary in accordance with time, they are the same at the respective points in time t.

For example, the steering angle $\delta_t$ (t=1, . . . , T), the characteristic vector p of the vehicle, the vectors $x_t$, and the matrix x are expressed as follows. Note that $\hat{X}$ in the formula means that the "^" mark is above letter X.

$$p \in \mathbb{R}^N \delta(t) \in \mathbb{R}^{1 \times T}$$

$$x_t = \left[\hat{\delta}_t, p_1, p_2, \ldots, p_N\right]$$

$$x = \left[x_1^T, x_2^T, \ldots, x_T^T\right]$$

$$x_t \in \mathbb{R}^{20}$$

In the above-described example, that characteristic vector p of the vehicle has elements of N dimensions, the vectors $x_t$ have elements of 20 dimensions, and the matrix x has 20×T elements.

The simulator section 60B predicts the times series of a state of the vehicle from the input data received by the input section 60A. The simulator section 60B is structured to include connected layers and convolutional layers. First, a feature amount is extracted from the input data by the connected layer. Thereafter, at the convolutional layer, the feature amount is convolved in the time series direction. Due thereto, the features at the respective points in time are extracted. Given that the connected layer is $FC_{in}(x)$, and, of the L convolutional layers, the lth convolutional layer of convolution width H is $Conv_{seq}^{(l)}$, and the lth weight is $$W_{seq}^{(l)} \in \mathbb{R}^{H \times D},$$

the output $$\hat{z}_t^{(l)} \in \mathbb{R}^D$$

that corresponds to the point in time t at the time of convolving at the lth convolutional layer is expressed as follows $$\hat{z}_t^{(0)} = FC_{in}\left(\left[x_t; z_{t-1}^{(0)}\right]\right) \tag{1}$$

$$\hat{z}_t^{(l)} = ReLU\left(W_{seq}^{(l)} \otimes \hat{z}_t^{l-1}\left[t - H - 1{:}t\right] + z_t^{l-1}\right) \tag{2}$$

wherein $\otimes$ is the Hadamard product, $z[t-H{:}t]=[z_{t-H}, z_{t-H+1}, \ldots, z_t]$, and ReLU(x)=max(0,x) is the function that computes per element. The reason for adding the feature that was outputted from the layer that is one before in formula (2) is in order to pass-on the gradient in the residual connection (refer to Reference Document 1). Further, by making this convolutional layer be dilated convolution, convolution at different time periods is possible (refer to Reference Document 2). For example, convolution processing by two convolutional layers is carried out at convolution width 2, and the dilations, which are the intervals of the values that are convolved by the respective filters, are set to 1 and 2, and therefore, modeling can be carried out by taking into consideration the points in time of a total of three steps before.

[Reference Document 1] Kaiming He, Xiangyu Zhang, Shaoqing Ren, and Jian Sun. Deep Residual Learning for Image Recognition. Proceedings of the IEEE Conference on Computer Vision and Pattern Recognition, pp. 770-778, 2016.

[Reference Document 2] Fisher Yu and Vladlen Koltun. Multi-Scale Context Aggregation by Dilated Convolutions. International Conference on Learning Representations (ICLR), May 2016.

By inputting output $z_t(L)$ of the final convolutional layer into connected layer $FC_{seq}(x)$, and predicting prediction results $\hat{s}_t$ of the state of the vehicle at point in time t in accordance with following formula (3), the time series $\hat{s}$ of the state of the vehicle is predicted.

$$\hat{S}_t = FC_{seq}\left(z_t^{(L)}\right) \tag{3}$$

$$\hat{S} = \left[\hat{S}_1, \hat{S}_2, \dots, \hat{S}_T\right]$$

The computing section 60C extracts the response of the vehicle from the predicted time series $\hat{s}$ of the state of the vehicle.

Concretely, from time series $\hat{s}$ of the state of the vehicle that was obtained by the simulator section 60B, the computing section 60C extracts the feature amount that expresses the time series $\hat{s}$ of the state of the vehicle by using the convolutional layer and the maximum pooling layer, and computes the response of the vehicle from this feature amount by using the connected layer.

At this time, the pooling is not carried out all at once, and the feature of the time series $\hat{s}$ of the state of the vehicle is extracted gradually by convolving of M layers and maximum value pooling, respectively. Given that the mth convolutional layer among the plural convolutional layers is $Conv_{pool}^{(m)}(x)$, and the mth maximum value pooling among the plural maximum pooling layers is $MaxPool^{(m)}(x)$, intermediate expression $h^{(m)}$ that is the output of the mth maximum pooling layer is expressed as follows.

$$h^{(0)} = \left[z^{(L)}; s\right] \tag{4}$$

$$h^{(m)} = MaxPool^{(m)}\left(ReLU\left(Conv_{pool}^{(m)}\left(h^{(m-1)}\right)\right)\right) \tag{5}$$

From $$h^{(M)} \in \mathbb{R}^D$$

that is the extracted feature of the time series, the final response

ô is predicted by using connected layer $FC_{out}(x)$.

$$\hat{o} = FC_{out}\left(h^{(M)}\right) \tag{6}$$

As shown in above formulas (1) and (2), in the present embodiment, the output of at least one convolutional layer of the CNN model is results that are obtained by applying an activation function to the sum of the convolution results, which are based on the output of the layer that is one before, and the output of the layer that is one before. By adding the output of the layer that is one before in this way, vanishing gradient and exploding gradient that are problems at the time of model learning can be avoided. As a result, because the model learning can be made to be more efficient, the prediction accuracy of the model can be improved.

Figure 4:
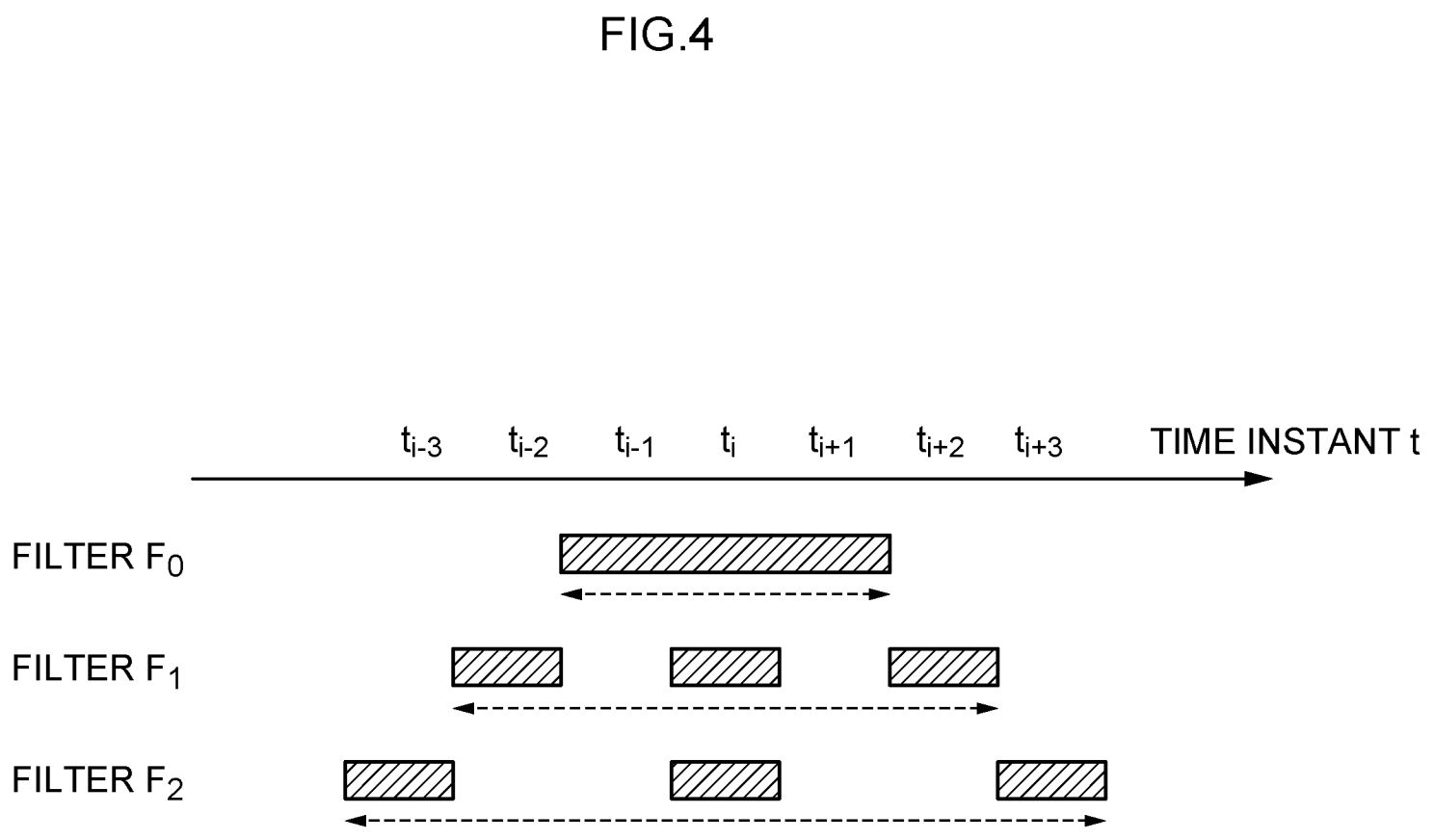

Further, when the feature amount is extracted by convolutional computing being carried out at the simulator section 60B, convolving of different time periods can be carried out by using dilated convolution. Concretely, as shown in FIG. 4, at the filters of the convolutional layers, the intervals in the time series direction of the convolution values by the filters differ. In FIG. 4, the hatched regions show the convolution values in the time series direction by the filters.

As a result, in addition to the "displacement" information that is obtained as a state amount of the vehicle, feature amounts that focus on the information of "velocity", "acceleration" and "acceleration gradient (jerk)" can be obtained. Above-described FIG. 4 shows an example in which filter $F_0$ (dilation=0) carries out convolution processing on values corresponding to the current time instant, the time instant that is one before, and the time instant that is one after, respectively. Further, an example is shown in which filter $F_1$ (dilation=1) carries out convolution processing on values corresponding to the current time instant, the time instant that is two before, and the time instant that is two after, respectively. An example is shown in which filter $F_2$ (dilation=2) carries out convolution processing on the values of the current time instant, the time instant that is three before, and the time instant that is three after, respectively. In this way, the interval of the convolution values is broadened with filter $F_1$ (dilation=1) and filter $F_2$ (dilation=2), and therefore, a feature amount that takes into consideration information such as acceleration, acceleration gradient (jerk) and the like can be obtained. The prediction accuracy of the model is improved by taking such information that has physical meaning into consideration as a feature amount.

The above-described CNN model is trained such that the intermediate output $\hat{s}$ of the CNN model corresponds to time series s of the state of the vehicle of the training data that is shown hereafter, and such that final output o of the convolutional neural network corresponds to the vehicle response of the training data.

$$s = [s_1, s_2, \dots s_T] \quad s_t \in \mathbb{R}^{31}$$

The model storing section 16 stores the parameters relating to the CNN model that was trained by the training section 14.

The input data preparing section 18 acquires the characteristic of the vehicle that is the object of vehicle response prediction, from the data of the 3D model of the vehicle that is the object of vehicle response prediction, which data is stored in the DB 54.

The input data preparing section 18 prepares input data that expresses the time series of a preset input to the vehicle and the acquired characteristic of the vehicle. Concretely, the input data preparing section 18 prepares, as the input data for the CNN model, matrix x in which vectors $x_t$, which express steering angle ^δt that is a preset input to the vehicle and acquired characteristic vector p of the vehicle, are lined up in time series order.

The predicting section 20 predicts the response of the vehicle that is the object of prediction, from the input data that was prepared by the input data preparing section 18 and by using the CNN model that was trained by the training section 14.

Concretely, the input data prepared by the input data preparing section 18 is inputted to the input section 60A of the CNN model 60 that was trained by the training section 14, and the output of the computing section 60C of the CNN model 60 is the prediction results of the response of the vehicle that is the object of prediction, and these prediction results are outputted by the display 40.

<Operation of Vehicle Response Predicting Device 10>

Operation of the vehicle response predicting device 10 relating to the embodiment of the present disclosure is described next.

First, data of simulation results by CAE that relate to vehicle response prediction is stored in the DB 54 that is connected to the data server 56. Then, data of a 3D model of the vehicle that is the object of vehicle response prediction is stored in the DB 54 that is connected to the data server 56.

Figure 5:
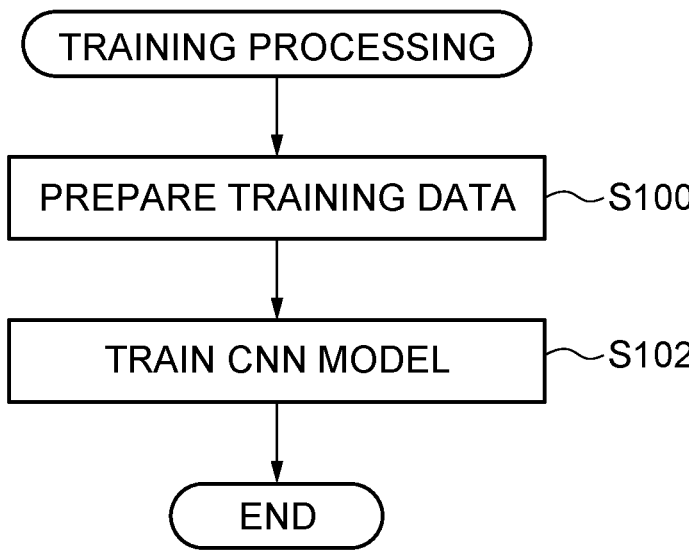
FIG. 5 is a flowchart showing training processing by the computer relating to the embodiment of the present disclosure.

Then, the training processing routine that is shown in FIG. 5 is executed by the computer 30.

First, in step S100, the training data preparing section 12 acquires the data of the simulation results that is stored in the DB 54. From the acquired data of the simulation results, the training data preparing section 12 prepares training data that expresses input data that expresses the time series of an input to the vehicle and a characteristic of the vehicle, the time series of a state of the vehicle, and response of the vehicle.

In step S102, on the basis of the training data, the training section 14 trains the CNN model, which is for predicting the response of the vehicle by using the input data as the input, and stores the parameters relating to the trained CNN model.

Figure 6:
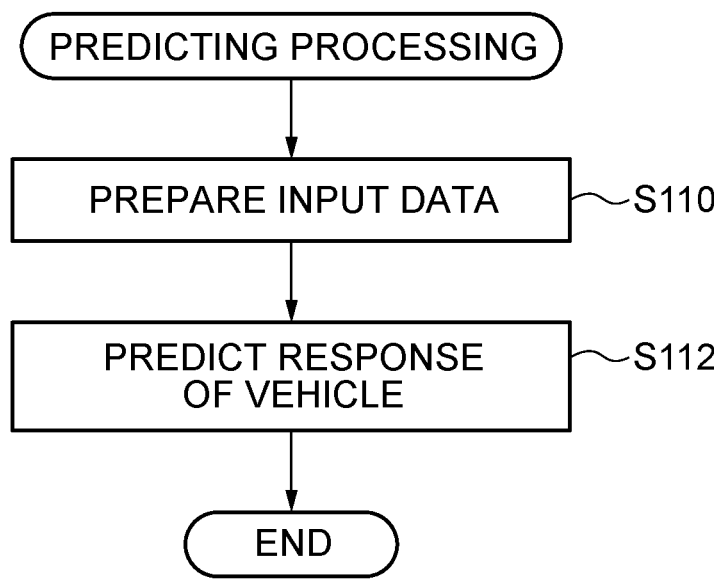
FIG. 6 is a flowchart showing predicting processing by the computer relating to the embodiment of the present disclosure.

Then, the predicting processing routine shown in FIG. 6 is executed by the computer 30.

First, in step S110, the input data preparing section 18 acquires the data of the 3D model of the vehicle that is the object of vehicle response prediction, which data is stored in the DB 54. From the acquired data of the 3D model of the vehicle that is the object of vehicle response prediction, the input data preparing section 18 acquires a characteristic of the vehicle that is the object of the vehicle response prediction. Then, the input data preparing section 18 prepares input data that expresses the time series of a preset input to the vehicle and the acquired characteristic of the vehicle.

In step S112, by using the CNN model that was trained by the training section 14, the predicting section 20 predicts the response of the vehicle that is the object of prediction, from the input data that was prepared by the input data preparing section 18.

Examples

Examples of the method of predicting vehicle response by using the CNN model that was described in the above embodiment are described next.

Figure 7:
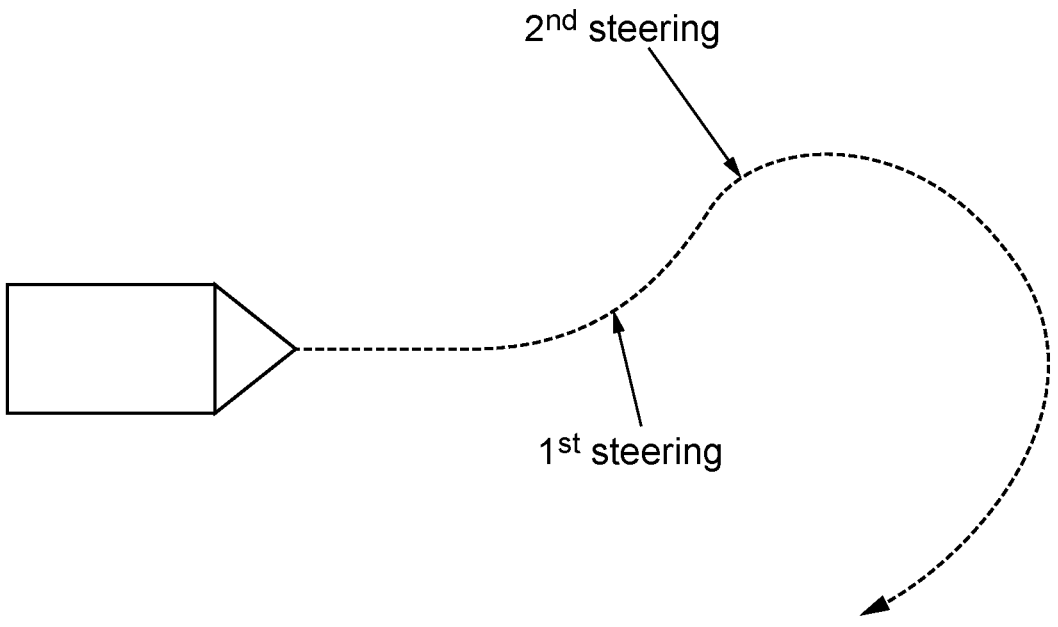
FIG. 7 is a schematic drawing showing an example of the traveling locus of an NCAP fishhook test that tests roll stability of a vehicle.

FIG. 7 is a schematic drawing showing an example of the traveling locus of an NCAP fishhook test that tests roll stability of a vehicle. In the test of FIG. 7, the maximum lateral acceleration of the vehicle at the time of turning when the steering wheel was operated in the left-right direction, was predicted with the vehicle speed being constant. The training data generated 752 designs by using DOE (design of experiments), and, as an example, CarMaker® that is a vehicle driving simulator was used.

Further, testing was carried out while comparing the prediction method using the CNN model that was described in the above embodiment, and the prediction method using the RNN model that is described in Reference Document 3. The program using in testing was installed by using the programming language Python version 3.6.9. The mechanical learning framework that was used was PyTorch version 1.3.

[Reference Document 3] Kohei Makino, Makoto Miwa, Kohei Shintani, Atsuji Abe, Yutaka Suzuki. Surrogate Modeling of Vehicle Dynamics Using Deep Learning. The Japan Society of Mechanical Engineers Design and Systems Division 29th Conference, 2019.

The data set is formed from the input data, the time series of the state of the vehicle that is computed in the midst of CAE analysis, and the response of the vehicle. One item of data is structured from, for example, parameter p that expresses a 19-dimensional characteristic of the vehicle, maximum value $\delta_{max}$ of the steering angle in the time series of the input to the vehicle, the time series of a 31-dimensional state of the vehicle such as the position, the roll angle or the like that is computed in the midst of CAE analysis, and the final five-dimensional response that is obtained by computing the maximum value or the minimum value or the like from that time series. The structure of the data set is as shown in Table 2.

TABLE 2

| training | evaluation | test | total |
|---|---|---|---|
| 600 | 76 | 76 | 752 |

Details of the CNN model are shown in Table 3.

TABLE 3

| | ID | name | formula | dimensions | convolution width | dilation | stride |
|---|---|---|---|---|---|---|---|
| simulator section | 1 | connected layer | formula (1) | 512 | | | |
| | 2 | convolutional layer | formula (2) | 512 | 2 | 1 | 1 |
| | 3 | convolutional layer | formula (2) | 512 | 2 | 2 | 1 |
| | 4 | connected layer | formula (3) output (series) | 512 31 | | | |
| computing section | 5 | convolutional layer | formula (5) | 512 | 2 | 1 | 1 |
| | 6 | maximum value pooling | formula (5) | 512 | 2 | 1 | 2 |

TABLE 3-continued

| ID | name | formula | dimensions | convolution width | dilation | stride |
|----|------|---------|------------|-------------------|----------|--------|
| 7 | convolutional layer | formula (5) | 512 | 3 | 1 | 1 |
| 8 | maximum value pooling | formula (5) | 512 | | | |
| 9 | connected layer | formula (6) | 512 | | | |
| | | output (response) 5 | | | | |

As shown in Table 3, the convolutional layer of the simulator section 60B uses dilated convolution. As described above, this is in order to carry out convolution at different time periods. Further, with regard to the maximum value pooling of ID 8, the reason why the convolution width and the like are not defined is because pooling is carried out by using the entire time sequence as the object.

In the model using RNN that is disclosed in Reference Document 1 and is the object of comparison, the convolutional layers of the CNN model of the above-described embodiment are replaced with Long Short-Term Memory that is a type of RNN.

The accuracies of the predicting method using the CNN model and the predicting method using the RNN model were evaluated by using root mean square error (RMSE). RMSE is expressed by the following formula. D in the following formula represents the number of data.

$$RMSE(y, \hat{y}) = \sqrt{\frac{1}{D} \sum_{i=1}^{D} (y_i - \hat{y}_i)^2}$$

Errors $e_i$ (i=1, 2, . . . , 5) in the respective response parameters are $$e_i = RMSE(y_i, \hat{y}_i)$$

These errors were normalized as follows by using average $\mu_i$ and variance $\sigma_i$ of the response of the training data, as scaling for evaluating the equivalence of the respective evaluation values.

$$\bar{e}_i = \frac{e_i - \mu_i}{\sigma_i}$$

For the testing procedure, the weights of the constructed model were initialized by initial random numbers of PyTorch, the model was trained, and thereafter, testing was carried out. For the scoring, the error was determined per epoch, and the score at the time when the average $$E = \frac{1}{5} \sum_{i=1}^{5} \bar{e}_i$$

of the errors of the response became the minimum was used as the score for that testing, and the final score was determined by taking the average of the scores of five rounds of testing. The standard error was used for the error.

In order to confirm the improvement in accuracy owing to the predicting method using the CNN model described in the above embodiment, this predicting method is compared with the predicting method using the RNN model of Reference Document 1. The results are shown in Table 4. The numbers that are underlined in Table 4 are those with a small error and that can be inferred accurately. Looking at Table 4, it can be said that, in the predicting of responses $o_1$, $o_2$, the CNN model exhibits a much better performance. Further, with regard to the predicting of response $o_3$, there is no great difference. With regard to the predicting of responses $o_4$, $o_5$, it can be said that the RNN model can predict more effectively. From the above results, it can be predicted that the tasks that are the respective strong points of the CNN model and the RNN model are different. However, when viewed on average, the CNN model has smaller prediction errors, and therefore, it can be said that the CNN model can model more effectively.

TABLE 4

| model | e1 roll angle max value | e2 lateral acceleration max value | e3 lateral acceleration min value | e4 ground contact load min value (left) | e5 ground contact load min value (right) | E average |
|-------|------------------------|-----------------------------------|-----------------------------------|-----------------------------------------|------------------------------------------|-----------|
| RNN | 4 ± 1 | 0.6 ± 0.2 | 0.36 ± 0.05 | 0.212 ± 0.006 | 0.256 ± 0.004 | 1.1 |
| CNN | 2.60 ± 0.04 | 0.22 ± 0.01 | 0.35 ± 0.01 | 0.288 ± 0.001 | 0.334 ± 0.001 | 0.75 |

As described above, in accordance with the present embodiment, the predicting section of the response predicting device predicts the response of a vehicle that is the object of prediction by using a CNN model for predicting vehicle response by using, as the input thereof, input data that expresses the time series of an input to the vehicle and a characteristic of the vehicle. At this time, in the CNN model, convolution processing is carried out on the input data that expresses the time series of the input to the vehicle and the characteristic of the vehicle. Due thereto, the response of the vehicle with respect to the time series of an input to the vehicle can be predicted accurately.

Further, training data is prepared from the input/output results of a time series obtained from a CAE simulator, and the CNN model is trained. Due thereto, CAE simulations, which full-time CAE workers have used while undertaking a large number of steps and bearing large computational costs, can be used by anyone without incurring time or costs.

Further, by using a CNN model, high speed computing by parallelization is possible, as compared with an RNN model. Further, as compared with an RNN model, a CNN model has the feature of modeling while focusing on a portion of a time series, rather than the entire time series.

State amounts (displacements and the like) of respective moments can be taken into consideration by the simulator section of the CNN model. Further, because vehicle response can be predicted while also taking into consideration a feature amount from the starting point in time to the ending point in time, the prediction accuracy improves.

Modified Example

The above embodiment describes, as an example, a case in which the predicting processing and the training processing are realized by a single device. However, the present disclosure is not limited to this, and may be structured so as to be divided into a vehicle response predicting device that carries out the predicting processing and a training device that carries out the training processing. In this case, the training device has the training data preparing section 12, the training section 14 and the model storing section 16. The vehicle response predicting device has the input data preparing section 18, the predicting section 20 and the model storing section 16.

The various types of processings that are executed by the CPU 32 reading-out software (programs) in the above-described embodiment may be executed by various types of processors other than a CPU. Examples of processors in this case include PLDs (Programmable Logic Devices) whose circuit structure can be changed after production such as FPGAs (Field-Programmable Gate Arrays) and the like, or dedicated electrical circuits that are processors having circuit structures that are designed for the sole purpose of executing specific processings such as ASICs (Application Specific Integrated Circuits) and the like, or the like. Further, the above-described training processing and predicting processing may be executed by one of these various types of processors, or may be executed by combining two or more of the same type or different types of processors (e.g., plural FPGAs, or a combination of a CPU and an FPGA, or the like). Further, the hardware structures of these various types of processors are, more concretely, electrical circuits that combine circuit elements such as semiconductor elements and the like.

Further, the above embodiment describes a form in which the respective programs are stored in advance (are installed) on a non-transitory recording medium that can be read by a computer. For example, the training program 46A and the vehicle response predicting program 46B are stored in advance in the HDD 46. However, the present disclosure is not limited to this, and the respective programs may be provided in the form of being recorded on a non-transitory recording medium such as a CD-ROM (Compact Disc Read Only Memory), a DVD-ROM (Digital Versatile Disc Read Only Memory), a USB (Universal Serial Bus) memory, or the like. Further, the programs may be in a form of being downloaded from an external device via a network.

The flow of processings described in the above embodiment also is an example, and unnecessary steps may be deleted, new steps may be added, or the order of processings may be rearranged, within a scope that does not depart from the gist of the present disclosure.

What is claimed is:

1. A vehicle response predicting device comprising:
a memory; and
a processor coupled to the memory,
wherein the processor is configured to:
acquire a 3D model of a vehicle;
acquire a characteristic of the vehicle based on the 3D model, the characteristic comprising a roll angle of the vehicle;
prepare input data that expresses a time series of preset input to the vehicle and the acquired characteristic of the vehicle, the input data comprising a matrix, the matrix comprising a plurality of vectors, each vector of the plurality of vectors comprising a steering angle at a particular time step and the acquired characteristic of the vehicle; and
by using a convolutional neural network model that has been trained in advance, and that is for predicting response of a vehicle, and whose input is input data expressing a time series of an input to the vehicle and a characteristic of the vehicle,
predict a response of the vehicle, wherein a filter of a convolutional layer includes a plurality of filters having different intervals, in a time series direction of values convolved by the filters,
wherein output of at least one convolutional layer of the convolutional neural network model is results obtained by applying an activation function to a sum of convolution results, which are based on output of a layer that is one before, and the output of the layer that is one before.

2. A training device comprising:
a memory; and
a processor coupled to the memory,
wherein the processor is structured so as to
acquire data of simulation results determined by computer aided engineering that relate to vehicle response prediction;
prepare, based on the simulation results, training data that expresses input data, which expresses a time series of an input to a vehicle and a characteristic of the vehicle, the characteristic comprising a roll angle of the vehicle, and response of the vehicle, from response of a vehicle that is obtained as results of simulation, the input data comprising a matrix, the matrix comprising a plurality of vectors, each vector of the plurality of vectors comprising a steering angle at a particular time step and the characteristic of the vehicle, and
train a convolutional neural network model for predicting response of the vehicle by using the input data as input, based on the training data, wherein output of at least one convolutional layer of the convolutional neural network model is results obtained by applying an activation function to a sum of convolution results, which are based on output of a layer that is one before, and the output of the layer that is one before.

3. The training device of claim 2, wherein the processor prepares training data that expresses input data, which expresses a time series of an input to a vehicle and a characteristic of the vehicle, a time series of a state of the vehicle, and response of the vehicle, from a time series of a state of a vehicle and response of the vehicle that are obtained as results of simulation based on a time series of input to the vehicle and a characteristic of the vehicle, and trains the convolutional neural network model such that intermediate output of the convolutional neural network model corresponds to the time series of the state of the vehicle of the training data, and final output of the convolutional neural network model corresponds to the response of the vehicle of the training data.

4. A vehicle response predicting method comprising predicting processing that, acquires a 3D model of a vehicle;

acquires a characteristic of the vehicle based on the 3D model, the characteristic comprising a roll angle of the vehicle;

prepares input data that expresses a time series of preset input to the vehicle and the acquired characteristic of the vehicle, the input data comprising a matrix, the matrix comprising a plurality of vectors, each vector of the plurality of vectors comprising a steering angle at a particular time step and the acquired characteristic of the vehicle; and by using a convolutional neural network model that has been trained in advance, and that is for predicting response of a vehicle, and whose input is input data expressing a time series of an input to the vehicle and a characteristic of the vehicle, predicts a response of the vehicle, wherein a filter of a convolutional layer includes a plurality of filters having different intervals, in a time series direction, of values convolved by the filters, wherein output of at least one convolutional layer of the convolutional neural network model is results obtained by applying an activation function to a sum of convolution results, which are based on output of a layer that is one before, and the output of the layer that is one before.

5. A training method comprising:

acquiring data of simulation results determined by computer aided engineering that relate to vehicle response prediction;

preparing, based on the simulation results, processing that prepares training data that expresses input data expressing a time series of an input to a vehicle and a characteristic of the vehicle, the characteristic comprising a roll angle of the vehicle, and response of the vehicle, from response of a vehicle that is obtained as results of simulation, the input data comprising a matrix, the matrix comprising a plurality of vectors, each vector of the plurality of vectors comprising a steering angle at a particular time step and the characteristic of the vehicle, and training processing that trains a convolutional neural network model for predicting response of the vehicle by using the input data as input, based on the training data, wherein output of at least one convolutional layer of the convolutional neural network model is results obtained by applying an activation function to a sum of convolution results, which are based on output of a layer that is one before, and the output of the layer that is one before.

6. A non-transitory recording medium on which is recorded a vehicle response predicting program executable by a computer to perform processing of:

acquiring a 3D model of a vehicle;

acquiring a characteristic of the vehicle based on the 3D model, the characteristic comprising a roll angle of the vehicle;

preparing input data that expresses a time series of preset input to the vehicle and the acquired characteristic of the vehicle, the input data comprising a matrix, the matrix comprising a plurality of vectors, each vector of the plurality of vectors comprising a steering angle at a particular time step and the acquired characteristic of the vehicle; and by using a convolutional neural network model that has been trained in advance, and that is for predicting response of a vehicle, and whose input is input data expressing a time series of an input to the vehicle and a characteristic of the vehicle, predicting a response of the vehicle, wherein a filter of a convolutional layer includes a plurality of filters having different intervals, in a time series direction, of values convolved by the filters, wherein output of at least one convolutional layer of the convolutional neural network model is results obtained by applying an activation function to a sum of convolution results, which are based on output of a layer that is one before, and the output of the layer that is one before.

7. A non-transitory recording medium on which is recorded a training program executable by a computer to perform processing of:

acquiring data of simulation results determined by computer aided engineering that relate to vehicle response prediction;

preparing, based on the simulation results, training data that expresses input data expressing a time series of an input to a vehicle and a characteristic of the vehicle, the characteristic comprising a roll angle of the vehicle, and response of the vehicle, from response of a vehicle that is obtained as results of simulation, the input data comprising a matrix, the matrix comprising a plurality of vectors, each vector of the plurality of vectors comprising a steering angle at a particular time step and the characteristic of the vehicle; and training a convolutional neural network model for predicting response of the vehicle by using the input data as input, based on the training data, wherein output of at least one convolutional layer of the convolutional neural network model is results obtained by applying an activation function to a sum of convolution results, which are based on output of a layer that is one before, and the output of the layer that is one before.

* * * * *